United States Patent [19]
Kaneyuki

[11] Patent Number: 4,738,164
[45] Date of Patent: * Apr. 19, 1988

[54] CENTRIFUGAL FORCE ADJUSTED INFINITELY VARIABLE DRIVE APPARATUS FOR AUXILIARY EQUIPMENT

[75] Inventor: Kazutoshi Kaneyuki, Himeji, Japan

[73] Assignee: Mitsubishi Denki Kabushiki Kaisha, Japan

[*] Notice: The portion of the term of this patent subsequent to Mar. 17, 2004 has been disclaimed.

[21] Appl. No.: 846,139

[22] Filed: Mar. 31, 1986

[30] Foreign Application Priority Data

Apr. 1, 1985 [JP] Japan .................................. 60-69507

[51] Int. Cl.$^4$ ............................................. F16H 15/50
[52] U.S. Cl. ...................................... 74/796; 74/752 B
[58] Field of Search ...................... 74/796, 752 B, 191, 74/190.5

[56] References Cited

U.S. PATENT DOCUMENTS

| | | | |
|---|---|---|---|
| 2,101,233 | 12/1937 | Bancroft | 74/752 B |
| 2,836,994 | 6/1958 | Weber | 74/796 |
| 2,879,972 | 3/1959 | Ranst | 192/104 |
| 2,886,986 | 5/1959 | Kopp | 74/796 |
| 3,023,642 | 3/1962 | Maichen | 74/796 |
| 3,023,644 | 3/1962 | Maichen | 74/796 |
| 3,108,497 | 10/1963 | Kashihara | 74/796 |
| 4,158,317 | 6/1979 | James | 74/752 B X |
| 4,232,561 | 11/1980 | Kashihara et al. | 74/796 X |
| 4,651,082 | 3/1987 | Kaneyuki | 322/29 |

FOREIGN PATENT DOCUMENTS

| | | |
|---|---|---|
| 0016710 | 10/1980 | European Pat. Off. . |
| 0158158 | 10/1985 | European Pat. Off. . |
| 2263382 | 10/1975 | France . |
| 2251839 | 10/1980 | France . |
| 5165 | 1/1979 | Japan . |
| 86434 | 6/1983 | Japan . |
| 137657 | 8/1983 | Japan .................................. 74/796 |
| 200838 | 11/1983 | Japan . |
| 795234 | 5/1958 | United Kingdom . |
| 1027511 | 4/1966 | United Kingdom . |
| 1469776 | 4/1977 | United Kingdom . |

*Primary Examiner*—Lawrence Staab
*Assistant Examiner*—Dwight G. Diehl
*Attorney, Agent, or Firm*—Leydig, Voit & Mayer

[57] ABSTRACT

A drive apparatus for driving the auxiliary equipment of an automobile engine or other motor is disclosed. It comprises a rotating input shaft which is connected to the crankshaft of an engine and on which is rotatably mounted a drive pulley which belt-drives auxiliary equipment. A planetary cone reduction gear is housed inside the pulley and transmits drive force from the input shaft to the pulley. A mechanism for adjusting the reduction ratio of the reduction gear operates in response to centrifugal force to reduce the reduction ratio of the reduction gear as the speed of the input shaft increases. The adjusting mechanism comprises a gear whose center of gravity is eccentric with respect to its rotational center and a cylindrical cam which is rotated by the rotation of the gear and whose rotation exerts a longitudinally-directed force on a speed change ring of the reduction gear.

3 Claims, 5 Drawing Sheets

CENTRIFUGAL FORCE ADJUSTED INFINITELY VARIABLE DRIVE APPARATUS FOR AUXILIARY EQUIPMENT

BACKGROUND OF THE INVENTION

This invention relates to a drive apparatus for driving the auxiliary equipment of a motor, and more particularly but not exclusively to the case in which the motor is the engine of an automobile.

In an automobile engine, auxiliary equipment such as charging gerators, water pumps, air conditioning compressors, and oil pumps for hydraulic steering are belt-driven by a drive pulley mounted on the end of the crankshaft. This auxiliary equipment is generally designed to be operated at relatively low speeds, and if driven at the same speed as the engine when the engine is running at high speeds, the operation of the auxiliary equipment would produce considerable power losses. Therefore, means are usually provided for adjusting the rotational speed of the drive pulley for the auxiliary equipment with respect to the rotational speed of the engine so that the auxiliary equipment can be operated at suitable speeds.

For example, Japanese Laid-Open Patent Application No. 58-200838 discloses a speed reduction apparatus for engine auxiliary equipment comprising a planetary gear reduction mechanism and a unidirectional clutch provided between an engine crankshaft and a pulley for auxiliary equipment, as well as a directly-coupled clutch comprising a hydraulic piston. At low engine speeds, the rotation of the crankshaft is transmitted directly to the pulley via the directly-coupled clutch. When the engine speed reaches a certain level, the directly-coupled clutch is disengaged, and the rotation of the crankshaft is transmitted to the pulley via the planetary gear and the one-way clutch at a reduced speed.

However, with that invention, there is a sudden change in the speed of the auxiliary equipment when the directly-coupled clutch is engaged or disengaged, which causes a shock to be imparted to both the engine and the auxiliary equipment. This shock reduces the stability of the automobile and imparts an unpleasant sensation to the driver. Furthermore, there are problems with the durability of the planetary gear reduction mechanism, and these can result in noise problems. Thus, this apparatus is not practical. Furthermore, as a planetary gear reduction mechanism is employed, the reduction ratio is not adjustable.

Japanse Laid Open Utility Model Application No. 58-86434 discloses a variable-speed driven apparatus for auxiliary equipment which utilizes two variable-pitch pulleys. A variable-pitch drive pulley is disposed on a crankshaft, and a variable-pitch driven pulley which is driven by the variable-pitch drive pulley with a belt is connected to the auxiliary equipment which is to be driven. Each variable-pitch pulley comprises a stationary portion and a movable portion which can be moved towards and away from the stationary portion in the axial direction of the pulley by a hydraulic cylinder mounted on the drive pulley so as to change the effective pitch of the pulleys, thereby adjusting the reduction ratio of the pulleys and controlling the speed of the auxiliary equipment connected to the driven pulley.

However, in that apparatus, a high-pressure oil source is necessary to operate the hydraulic cylinder, and the structure of the hydraulic actuator for the hydraulic cylinder is complicated. Furthermore, the apparatus projects by a considerable amount in the axial direction of the crankshaft of the engine, making it unsuitable for automobiles having a limited installation space such as front wheel drive automobiles in which the engine is disposed sideways.

SUMMARY OF THE INVENTION

It is an object of the present invention to overcome the above-described problems of the prior art and to provide a drive apparatus for auxiliary equipment which enables the speed of the auxiliary equipment to be changed in a smooth and silent manner without imparting shocks to the engine or the auxiliary equipment.

It is another object of the present invention to provide a drive apparatus for auxiliary equipment which is extremely compact and which is the same size as a conventional drive pulley for auxiliary equipment.

It is yet another object of the present invention to provide a drive apparatus for auxiliary equipment which can drive the auxiliary equipment at low speeds when the speed of the motor whose rotational force it transmits to the auxiliary equipment is high.

It is still another object of the present invention to provide a drive apparatus for auxiliary equipment which does not require an external controller.

It is a further object of the present invention to provide a drive apparatus for auxiliary equipment which is powered entirely by the motor whose rotational force it transmits to the auxiliary equipment.

A drive apparatus according to the present invention comprises a rotating input member which is connected to a motor so as to be driven thereby and a rotating output member which is drivingly connected to auxiliary equipment. Rotational force is transmitted from the input member to the output member by an adjustable planetary come reduction gear, the reduction ratio of which can be changed by moving a speed change ring of the reduction gear in the axial direction of the rotating input member. The reduction ratio of the reduction gear is automatically adjusted by an adjusting mechanism which is responsive to the centrifugal force acting thereon so as to reduce the reduction ratio of the reduction gear as the rotational speed of the rotating input member increases. In a preferred embodiment, the rotating input member is an input shaft which is connected to the crankshaft of an automobile engine, and the rotating output member is a pulley which houses the reduction gear and which belt-drives the auxiliary equipment.

BRIEF DESCRIPTION OF THE DRAWINGS

In the drawings, the same reference numerals indicate the same parts.

DESCRIPTION OF THE PREFERRED EMBODIMENT

Figure 1:
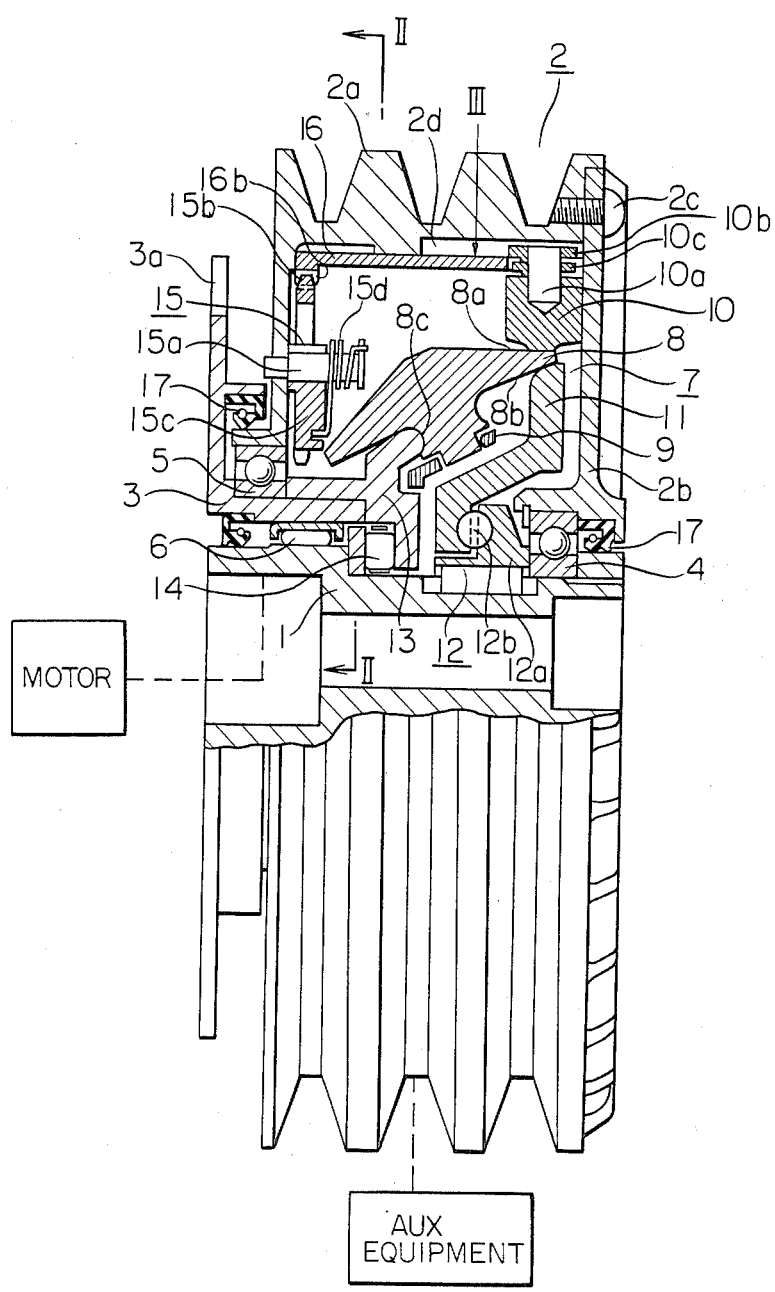
FIG. 1 is a partially cross-sectional side view of an auxiliary equipment drive apparatus according to the present invention, showing the state in which the speed change ring is in contact with the planetary cones near their bases.

Hereinbelow, an embodiment of an auxiliary equipment drive apparatus according to the present invention will be described while referring to the accompanying drawings, of which FIG. 1 is a partially cross-sectional side view of this embodiment. As shown in this figure, a rotating input member in the form of a hollow input shaft 1 is directly connected to the crankshaft of an unillustrated engine. A rotating output member in the form of a pulley 2 is rotatably supported by the input shaft 1 and by a stationary plate 3. The pulley 2 comprises a peripheral casing 2a and an end plate 2b which is secured to the casing 2a by screws 2c. The pulley 2 drives a number of pieces of unillustrated auxiliary equipment by belts which are wound around grooves formed in the pulley casing 2a. The outer dimensions of the pulley 2 are identical to those of a conventional drive pulley for auxiliary equipment. The end plate 2b is rotatably supported by the input shaft 1 through a ball bearing 4, while the peripheral casing 2a is rotatably supported by the stationary plate 3 through another ball bearing 5. The stationary plate 3 has an installation portion 3a which which it is secured to a stationary portion of the engine by unillustrated bolts or other suitable means. A roller bearing 6 is provided between the input shaft 1 and a flange portion of the stationary plate 3 which surrounds the input shaft 1.

Between the input shaft 1 and the peripheral casing 2a of the pulley 2 is an adjustable, stepless, frictional speed change mechanism in the form of a planetary cone reduction gear 7 which transmits drive force from the input shaft 1 to the pulley 2 at an adjustable speed. The planetary cone reduction gear 7 has a plurality of stemmed planetary cones 8 which are rotatably mounted by their stems on a cone support ring 9 which surrounds the input shaft 1 and can rotate with respect thereto. Each of the cones 8 has a first frictional transmission surface 8a which forms the top surface of the cone 8, a second frictional transmission surface 8b which forms the base of the cone 8, and a third frictional transmission surface 8c which forms the periphery of the stem of the cone 8. The axis of each cone 8 is sloped with respect to the axis of the input shaft 1 so that a line which is parallel to the axis of the input shaft 1 can be drawn from the vertex of the cone 8 to its base along its top surface. The first frictional transmission surface 8a of each cone 8 frictionally engages with the inner surface of a speed change ring 10 which is concentrically disposed with respect to the input shaft 1. The speed change ring 10 has a plurality of pins 10a secured to its outer surface, and on each of these pins 10a are rotatably mounted two roller keys 10b and 10c. The outer roller keys 10b are slidably disposed inside corresponding axially-extending grooves 2d formed in the inner surface of the peripheral casing 2a of the pulley 2. With this structure, the rotation of the speed change ring 10 is transmitted to the peripheral casing 2a of the pulley 2 by the outer roller keys 10b, causing the pulley 2 to rotate at the same speed as the speed change ring 10, but at the same time, the speed change ring 10 is able to freely move in the axial direction of the pulley 2. The second frictional transmission surface 8b of each cone 8 is in frictional engagement with the outer periphery of an input ring 11 which surrounds the input shaft 1. The input ring 11 is caused to rotate together with the input shaft 1 by a transmission mechanism 12 comprising a first race 12a which is secured to the input shaft 1 and a plurality of balls 12b. The balls 12b are held between the undulating surface of the first race 12a and a similar undulating surface of a second race which is formed on the inner portion of the input ring 11. When the input shaft 1 is rotated, the transmission mechanism 12 exerts a torque on the input ring 11 as well as a force in the axial direction which causes the outer end of the input ring 11 to contact with the second frictional transmission surface 8b of each of the planetary cones 8. The third frictional transmission surface 8c of each planetary cone 8 is in frictional engagement with the outer peripheral surface of a stationary guide ring 13 which is secured to the stationary plate 3. When the planetary cones 8 are caused to rotate about their axes by the rotation of the input ring 11, the frictional engagement between the stationary guide ring 13 and the third frictional transmission surfaces 8c causes the planetary cones 8 to revolve about the axis of the input shaft 1. A roller bearing 14 is disposed between the stationary guide ring 13 and the input shaft 1.

The reduction ratio of the reduction gear 7 can be adjusted by moving the speed change ring 10 in the axial direction of the input shaft 1 along the first frictional transmission surfaces 8a of the planetary cones 8, and this is accomplished by a reduction ratio adjustment mechanism consisting of a centrifugal drive mechanism 15 and a cylindrical cam 16 which is driven thereby. The cylindrical drive mechanism 15 comprises a support pin 15a which is secured to the side portion of the peripheral casing 2a of the pulley 2, a drive gear 15b which is rotatably mounted on the support pin 15a, and a torsional spring which is mounted on the support pin 15a and which is connected between the support pin 15a and the drive gear 15b so as to apply a torque to the drive gear 15b about the center of the support pin 15a. The drive gear 15b has an eccentric weight 15c formed thereon, and on account of the eccentric weight 15c, the center of gravity of the drive gear 15b is eccentric with respect to the support pin 15a. A plurality of these centrifugal drive mechanisms 15 are mounted on the pulley casing 2a at intervals around the input shaft 1.

Figure 3:
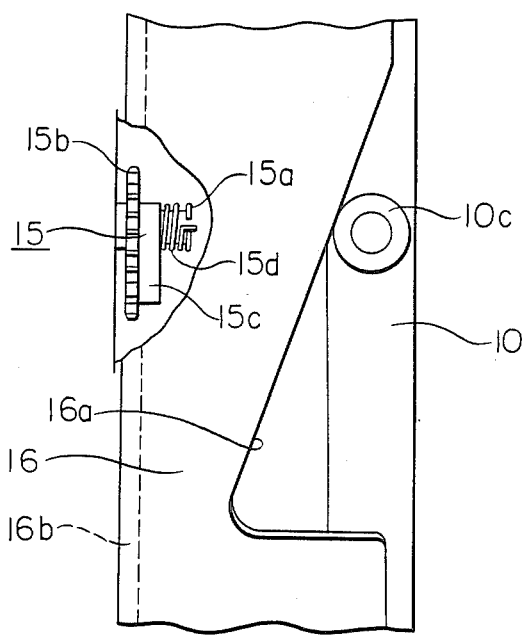
FIG. 3 is a fragmentary plan view of the centrifugal drive gear and the cylindrical cam looking in the direction of Line III of FIG. 1.

The cylindrical cam 16 is a tubular member which is supported by the pulley casing 2a so as to be able to freely rotate with respect thereto. At one end, it has a plurality of longitudinally-extending cam surfaces 16a each of which contacts one of the inner roller keys 10c which are mounted on the speed change ring 10. The shape of these cam surfaces 16a is best shown in FIG. 3, which is a plan view taken in the direction of Line III of FIG. 1. When the cylindrical cam 16 is rotated in one direction, the cam surfaces 16a exert a longitudinally-directed force on the speed change ring 10 through the inner roller keys 10c. At the end opposite from the cam surfaces 16a, the cylindrical cam 16 has an internal gear 16b formed thereon. This internal gear 16b meshes with the drive gears 15b of the centrifugal drive mechanisms 15.

Next, the operation of this embodiment will be explained. When the input shaft 1 is rotated by the crankshaft of the unillustrated engine, the input ring 11 is caused to rotate about the center of the input shaft 1 by the transmission mechanism 12, and the frictional engagement between the input ring 11 and the planetary cones 8 causes the planetary cones 8 to rotate about their axes. At the same time, due to the frictional engagement between the planetary cones 8 and the stationary guide ring 13, the planetary cones 8 revolve about the input shaft 1, performing planetary motion. The frictional engagement between the planetary cones 8 and the speed change ring 10 causes the speed change ring 10 to rotate about the center of the input shaft 1, and this rotation is transmitted to the pulley casing 2a by the outer roller keys 10b. The pulley 2 thus rotates at the same speed as the speed change ring 10, and the unillustrated axuiliary equipment is belt-driven by the pulley 2.

Figure 7:
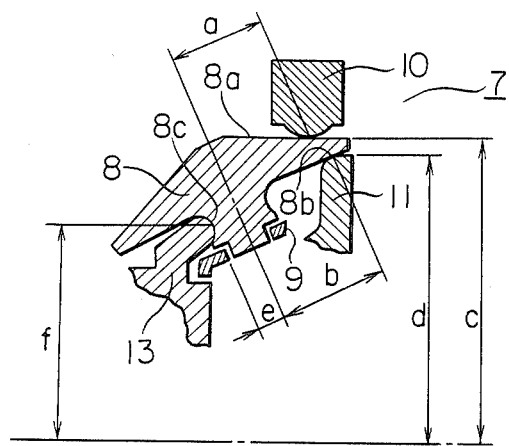
FIG. 7 is a cross-sectional view of a portion of the planetary cone reduction gear 7 of FIG. 1, illustrating the effective radii of the various components.

The rotational speed of the pulley 2 is determined by the reduction ratio of the planetary cone reduction gear 7. As can be seen from consideration of FIG. 7, which is a cross-sectional view of a portion of the planetary cone reduction gear 7, the reduction ratio is determined by the distance from the vertices of the planetary cones 8 of the point of contact between the first frictional transmission surfaces 8a and the speed change ring 10. The reduction ratio is expressed by the following formula:

$$\text{Reduction Ratio} = N2/N1 = d(ec + fa)/c(ed + fb)$$

wherein

N1 is the rotational speed of the input shaft 1;
N2 is the rotational speed of the pulley 2;
a is the distance from the axis of each cone 8 to the point of contact between the first frictional transmission surface 8a and the speed change ring 10;
b is the distance from the axis of each cone 8 to the point of contact between the second frictional transmission surface 8b and the input ring 11:
c is the distance from the axis of the input shaft 1 to the point of contact between the first frictional transmission surface 8a and the speed change ring 10;
d is the distance from the axis of the input shaft 1 to the point of contact between the second frictional transmission surface 8b and the input ring 11;
e is the distance from the axis of each cone 8 to the point of contact between the third frictional transmission surface 8c and the stationary guide ring 13; and
f is the distance from the axis of the input shaft 1 to this same point of contact.

Since the values of b through f are fixed, the reduction ratio can be adjusted by changing the distance a. This is accomplished by the reduction ratio adjusting mechanism comprising the centrifugal drive mechanisms 15 and the cylindrical cam 16, the operation of which is as follows.

Figure 2:
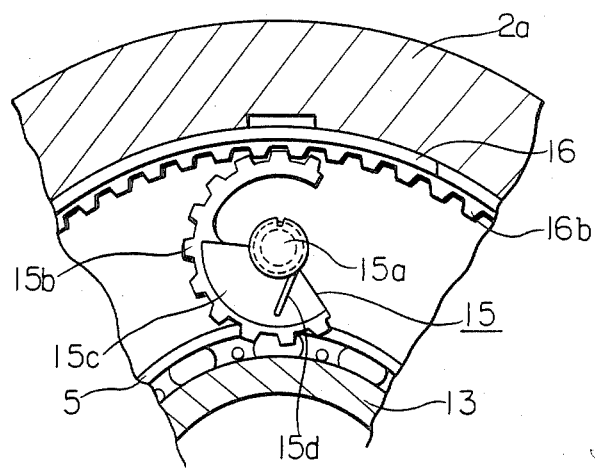
FIG. 2 is a cross-sectional view taken along Line II—I1 of FIG. 1.

The torsional spring 15d of the centrifugal drive mechanism 15 exerts a counterclockwise torque (as seen in FIG. 2) on the drive gears 15b which tends to rotate the cylindrical cam 16 so that the cam surfaces 16b will push the speed change ring 10 away from the vertices of the planetary cones 8. When the rotational speed of the pulley 2 is low, the speed change ring 10 will be pushed all the way against the surface of the end plate 2b of the pulley 2, to the position shown in FIG. 1. In this position, in the present embodiment, the reduction ratio N2/N1 is equal to approximately 1, and the input shaft 1 and the pulley 2 rotate at the same speed.

However, the rotation of the pulley 2 causes a centrifugal force to be exerted on the eccentric weights 15c of the drive gears 15b, and due to the eccentricity of the weights 15c, the centrifugal force produces a clockwise torque (as viewed in FIG. 2) on the drive gears 15b which is opposite in direction to the torque exerted by the torsional springs 15d, and this torque increases as the rotational speed of the pulley 2 increases. When the rotational speed of the pulley 2 is low, the clockwise torque acting on the drive gears 15b due to centrifugal force is less than the counterclockwise torque exerted by the torsional springs 15d, but when the speed of the pulley 2 reaches a certain point, the clockwise torque will exceed the counterclockwise torque, and the drive gears 15b will rotate about the support pins 15a until the torque due to centrifugal force balances the torque exerted by the torsional springs 15d. The rotation of the drive gears 15b causes the cylindrical cam 16 to rotate in the clockwise direction in FIG. 2.

As is well-known, in a planetary cone reduction gear of the type employed in the present embodiment, when the speed change ring 10 is transmitting rotational drive force, the planetary motion of the planetary cones 8 produces a longitudinally-directed biasing force which constantly acts on the speed change ring 10. In the present invention, this biasing force on the speed change ring 10 acts so as to move it towards the vertices of the planetary cones 8. i.e., in the direction so as to decrease the reduction ratio N2/N1. This causes the inner roller keys 10c to constantly press against the cam surfaces 16b.

Accordingly, when the cylindrical cam 16 is rotated in the clockwise direction, the biasing force acting on the speed change ring 10 causes it to follow the cam surfaces 16a, moving in the longitudinal direction towards the vertices of the cones 8. The more the cylindrical cam is rotated in the clockwise direction, the closer the speed change ring 10 will move to the vertices of the planetary cones 8 and the more the reduction ratio N2/N1 will decrease. Finally, the speed change ring 10 will reach the position shown in FIG. 4 in which it is in the vicinity of the vertices of the planetary cones 8. In this position, the reduction ratio N2/N1 is approximately 0.4, and as the speed change ring 10 is prevented from moving farther to the left in the figure by a ledge formed in the pulley casing 2a which the outer roller keys 10b abut against, the reduction ratio does not decrease beyond this point.

Figure 4:
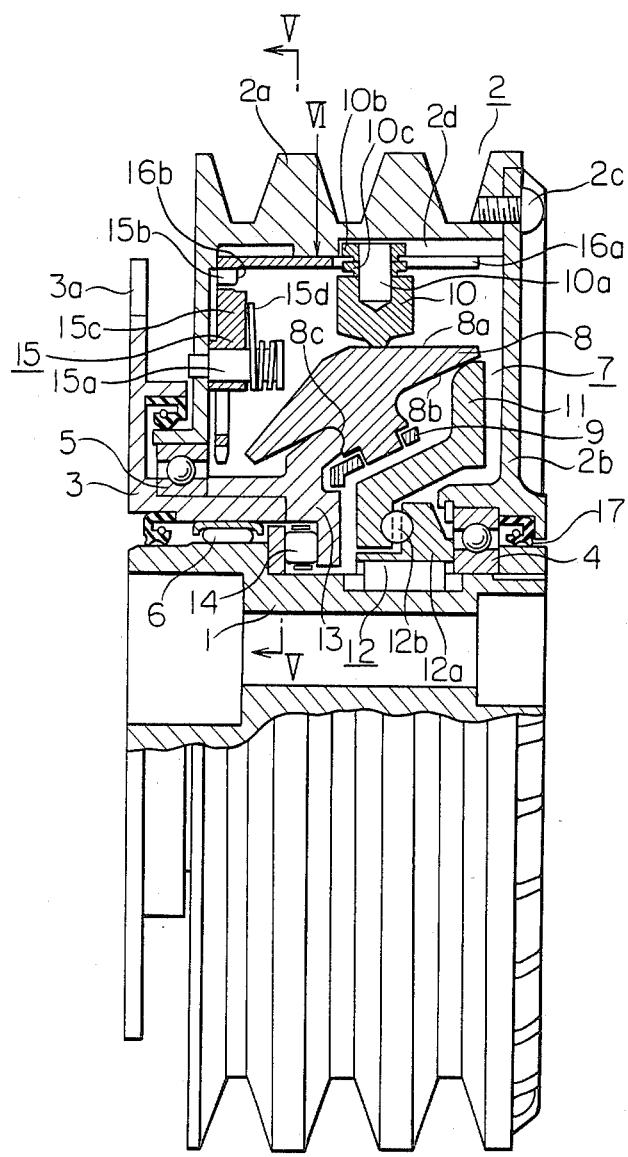
FIG. 4 is a partially cross-sectional side view similar to FIG. 1, showing the state in which the speed change ring is in contact with the planetary cones near their vertices.
Figure 5:
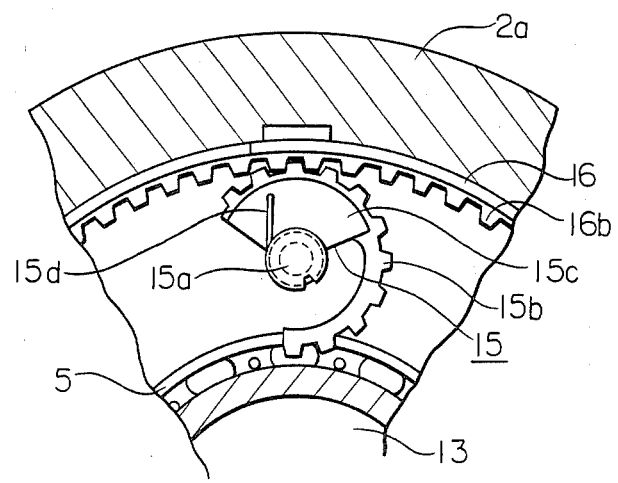
FIG. 5 is a cross-sectional view taken along Line V—V of FIG. 4.
Figure 6:
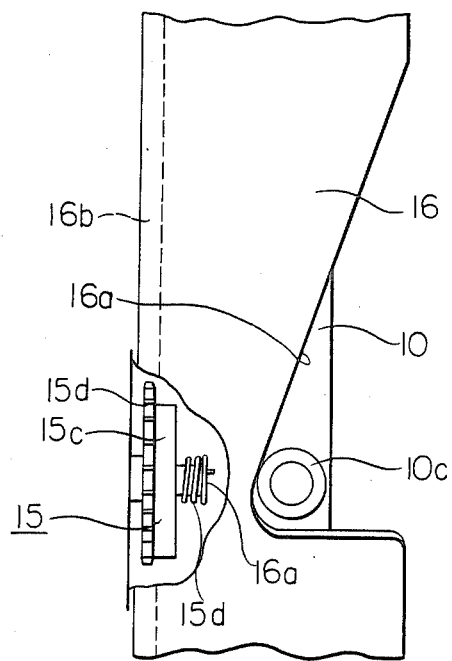
FIG. 6 is a fragmentary plan view looking in the direction of Line VI of FIG. 4.

On the other hand, if the rotational speed of the pulley 2 decreases from the speed corresponding to the state shown in FIG. 4, the clockwise torque acting on the drive gears 15b due to centrifugal force will decrease, and the counterclockwise torque exerted by the torsional springs 15d will force the drive gears 15b to rotate counterclockwise (as seen in FIG. 5) until the counterclockwise torque equals the clockwise torque due to centrifugal force. The counterclockwise rotation of the drive gears 15b will drive the cylindrical cam 16 in the counterclockwise direction, and the cam surfaces 16a will push the speed change ring 10 in the direction away from the vertices, thereby increasing the reduction ratio N2/N1.

Figure 8:
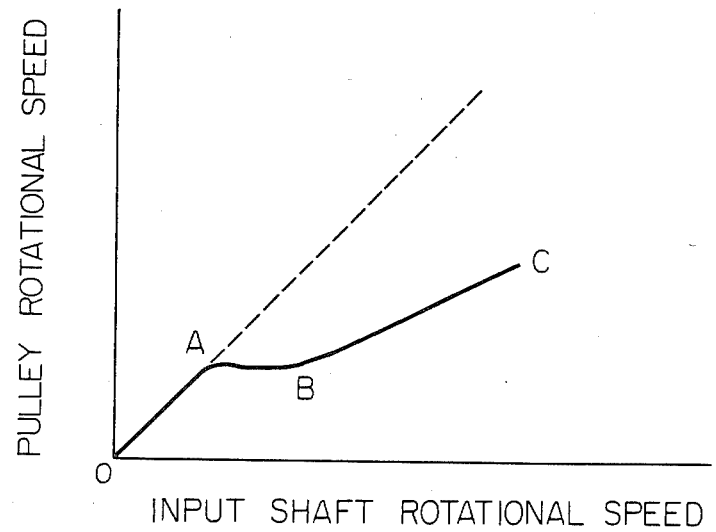
FIG. 8 is a graph illustrating the relationship between input shaft rotational speed and pulley rotational speed during the operation of the present invention.

The operating characteristics of this embodiment are illustrated graphically in FIG. 8, which shows the rotational speed of the pulley 2 plotted as a function of the rotational speed of the input shaft 1. When the rotational speed of the input shaft 1 is low, the speed change ring 10 is in the position shown in FIG. 1, and the reduction ratio N2/N1 is approximately 1. As the rotational speed of the input shaft 1 increases, the rotational speed of the pulley 2 initially increases linearly at the same rate as the input shaft 1. However, when the rotational speed of the pulley 2 reaches a certain level, indicated by point A in the graph, the torque produced on the eccentric weights 15c by centrifugal force begins to overcome the torque exerted by the torsional springs 15d. If the rotational speed of the input shaft 1 increases beyond this point, the drive gears 15b rotate the cylindrical cam 16, and the biasing force acting on the speed change ring 10 causes it to move towards the vertices of the planetary cones 8 as far as is allowed by the cam surfaces 16a. The reduction ratio N2/N1 is thus reduced so as to maintain the rotational speed of the pulley 2 substantially constant, despite the increase in the rotational speed of the input shaft 1. Point B on the curve corresponds to the situation illustrated in FIG. 4, in which the speed change ring 10 has moved as far as it can along the surface of the planetary cones 8. If the rotational speed of the input shaft 1 increases beyond this point, the rotational speed of the pulley 2 smoothly increases at a constant reduction ratio of 0.4.

Since the speed change ring 10 can be moved to any position along the first frictional transmission surfaces 8a of the planetary cones 8, continuous, stepless adjustment of the reduction ratio of the reduction gear 7 is possible. Changes in the reduction ratio can be effected extremely smoothly without imparting any shocks to the engine or the auxiliary equipment. Also, as the reduction gear 7 is of the planetary cone type, its operation is extremely quiet.

Furthermore, as the auxiliary equipment can be driven at a low speed even when the engine is running at a high speed, power losses due to the auxiliary equipment can be decreased and the fuel efficiency of the engine can be increased.

Because of the planetary cone reduction gear 7 and the reduction ratio adjustment mechanism are housed within a pulley 2 having the same size as a conventional drive pulley for auxiliary equipment, it is possible to employ the present invention even in vehicles having a very limited installation space, such as in front-wheel drive automobiles.

In the present embodiment, a pulley 2 is used to transmit drive force to auxiliary equipment. However, if the drive belt grooves formed in the outer surface of the pulley casing 2a are replaced by spruckets, gear teeth, or the like, it is possible to transmit drive force to auxiliary equipment by means other than a drive belt.

Although the above description was made with respect to the case in which the motor to which the present invention is applied is an automobile engine. It can be applied to other types of motors and provided the same effects.

What is claimed is:

1. A drive apparatus
for driving auxiliary equipment of a motor comprising:
a rotating input member adapted to be connected to said motor so as to be driven thereby;
a rotating output member adapted to be connected to said auxiliary equipment so as to drive said auxiliary equipment, said output member including a cylindrical body which surrounds said rotating input body;
an adjustable, stepless speed change mechanism connected between said rotating input member and said rotating output member so as to transmit rotational force from said input member to said output member, said speed change mechanism including a planetary cone reduction gear housed inside said cylindrical output body;
a cone support ring mounted on said rotating input member and rotatable with respect thereto:
a plurality of planetary cones having stems rotatably mounted on said cone support ring, the axis of each of said planetary cones being disposed such that a line which is parallel to said rotating input member can be drawn from the vertex of each cone to its base along its top surface:
a stationary guide ring surrounding said rotating input member and frictionally engaging with the peripheral surfaces of the stems of said planetary cones:
a speed change ring surrounding said rotating input member and having an inner surface in frictional engagement with the top surfaces of said planetary cones, said speed change ring being supported by said rotating output member so as to rotate together with said rotating output member and to move in an axial direction of said rotating output member with respect thereto:
an input ring surrounding said rotating input member and having an outer peripheral surface in frictional engagement with the bases of said planetary cones;
means for transmitting rotational force from said rotating input member to said input ring; and
adjusting means for adjusting the reduction ratio of said speed change mechanism in response to centrifugal force acting on said adjusting means so as to reduce the reduction ratio of said speed change mechanism as the rotational speed of said input member increases.

2. A drive apparatus as claimed in claim 1, wherein said adjusting means comprises:
a drive gear which is rotatably supported by said rotating output member with its rotational axis parallel to the axis of said rotating input member, the center of gravity of said drive gear being eccentric with respect to its rotational center;
means for exerting a torque on said drive gear about its rotational axis which is opposite in direction to the torque exerted on said drive gear by centrifugal force when said rotating output member is rotated;
a longitudinally-extending cylindrical cam which is rotatably supported by said rotating output member, said cylindrical cam having an internal gear portion at one end which meshes with said drive gear so as to be driven by the rotation of said drive gear and a longitudinally-extending cam surface at its other end; and
force transmitting means for transmitting a longitudinally-directed force from said cam surface to said speed change ring when said cylindrical cam is rotated.

3. A drive apparatus as claimed in claim 2, wherein said force transmitting means comprises a roller key which is rotatably mounted on said speed change ring and which contacts said cam surface of said cylindrical cam.

* * * * *